(12) United States Patent
Racanière

(10) Patent No.: US 8,368,689 B2
(45) Date of Patent: Feb. 5, 2013

(54) SYSTEM, METHOD, AND COMPUTER PROGRAM PRODUCT FOR RADIAL FUNCTIONS AND DISTRIBUTIONS OF THREE DIMENSIONAL OBJECT MODELS

(75) Inventor: Sébastien Racanière, Spring Street (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 761 days.

(21) Appl. No.: 12/552,775

(22) Filed: Sep. 2, 2009

(65) Prior Publication Data
US 2010/0073365 A1 Mar. 25, 2010

Related U.S. Application Data

(60) Provisional application No. 61/100,143, filed on Sep. 25, 2008.

(51) Int. Cl.
*G06T 15/00* (2011.01)
(52) U.S. Cl. ....................................... 345/419
(58) Field of Classification Search .................. None
See application file for complete search history.

(56) References Cited

U.S. PATENT DOCUMENTS

| | | | | |
|---|---|---|---|---|
| 2004/0049309 | A1* | 3/2004 | Gardner et al. | 700/132 |
| 2004/0175039 | A1* | 9/2004 | Miller | 382/181 |
| 2004/0264777 | A1* | 12/2004 | Furuhashi et al. | 382/190 |
| 2005/0168460 | A1* | 8/2005 | Razdan et al. | 345/419 |
| 2007/0242083 | A1* | 10/2007 | Kataoka et al. | 345/623 |

OTHER PUBLICATIONS

Papadakis et al.; "Efficient 3D shape matching and retrieval using a concrete radicalized spherical projection representation ;" Pattern Recognition, the Journal of the Pattern Recognition Society, vol. 40 (2007), pp. 2437-2452; Published by Elsevier, Ltd., Jun. 2007.*
Michael Kazhdan, Thomas Funkhouser, and Szymon Rusinkiewicz, Rotation Invariant Spherical Harmonic Representation of 3D Shape Descriptors, Department of Computer Science, Princeton University, Princeton NJ, Eurographics Symposium on Geometry Processing (2003), Aachen, Germany; Jun. 2003.

* cited by examiner

*Primary Examiner* — Edward Martello

(57) ABSTRACT

A system, method, and computer program product for determining a radial function and distribution of a three-dimensional object model. One method includes retrieving a three-dimensional object model in a CAD system and sampling random points on the surface of the object model. The method also includes determining a normal vector corresponding to each of the random points and determining a radial function corresponding to each normal vector and respective random point. The method also includes determining, by the CAD system, a radial distribution corresponding to at least two of the radial functions and storing the radial distribution and average values of the radial functions in the CAD system.

20 Claims, 4 Drawing Sheets

SYSTEM, METHOD, AND COMPUTER PROGRAM PRODUCT FOR RADIAL FUNCTIONS AND DISTRIBUTIONS OF THREE DIMENSIONAL OBJECT MODELS

CROSS-REFERENCE TO OTHER APPLICATION

This application claims priority from U.S. Provisional Patent Application 61/100,143, filed Sep. 25, 2008, which is hereby incorporated by reference.

TECHNICAL FIELD

The present disclosure is directed, in general, to computer aided design, drafting, manufacturing, and visualization systems (individually and collectively, "CAD systems").

BACKGROUND OF THE DISCLOSURE

CAD systems often use databases of geometric models, both two-dimensional (2D) and three-dimensional (3D).

SUMMARY OF THE DISCLOSURE

Various embodiments include a system, method, and computer program product for determining a radial function and distribution of a three-dimensional object model. One method includes retrieving a three-dimensional object model in a CAD system and sampling random points on the surface of the object model. The method also includes determining a normal vector corresponding to each of the random points and determining a radial function corresponding to each normal vector and respective random point. The method also includes determining, by the CAD system, a radial distribution corresponding to at least two of the radial functions and storing the radial distribution and average values of the radial functions in the CAD system.

Some embodiments also include associating the radial distribution with the object model as a CAD object descriptor. In various embodiments, the random points are sampled using a uniform distribution, the radial function is determined according to a projection of the random point on a sphere, and/or determining the radial function includes using a correcting term to adjust for non-uniform distribution of the sampled points as projected on a sphere. In various embodiments, the radial function is associated with a function on three-dimensional space and the three-dimensional object model, sample points within a preselected normal distance from the origin are ignored, the radial distribution is associated with a function on three-dimensional space and the three-dimensional object model as the quotient of a first radial function and a second radial function, the second radial function is associated with a function on three-dimensional space that is constant and equal to one, and/or the radial functions and the radial distribution corresponding to the object model are stored in the CAD system as average values on elements of a partition of a sphere.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Fast retrieval of 3D models in a database requires representing these models by a descriptor. Associated radial functions and distributions are such descriptors. Such descriptors are known to those of skill in the art, and are described, e.g., in *Rotation Invariant Spherical Harmonic Representation of 3D Shape Descriptors*, M. Kazhdan, T. Funkhouser, Szymon Rusinkiewicz; Eurographics Symposium on Geometry Processing (2003), hereby incorporated by reference.

It is common to make these descriptors both scale and translation invariants, but it is more difficult to make them rotation invariant. The Kazhdan paper demonstrates a method to transform these descriptors into rotation-invariant ones. This method typically requires knowing the value of a radial function or distribution on the sphere. It is often sufficient to know the values of the radial function or distribution at a set of points on the sphere. If a CAD system needs to know the value of the radial distribution at say N points on the sphere and if the surface is given by a set of say T triangles, then a direct and naïve approach to computing the N values will require O(N×T) operations (each triangle is tested for intersection against the rays defined by the origin and each of the N points). The disclosed embodiments include a process, data processing system, and computer program product to replace this number of operations by the much faster O(N+T+K), where K is a fixed number independent of N and T.

Figure 1:
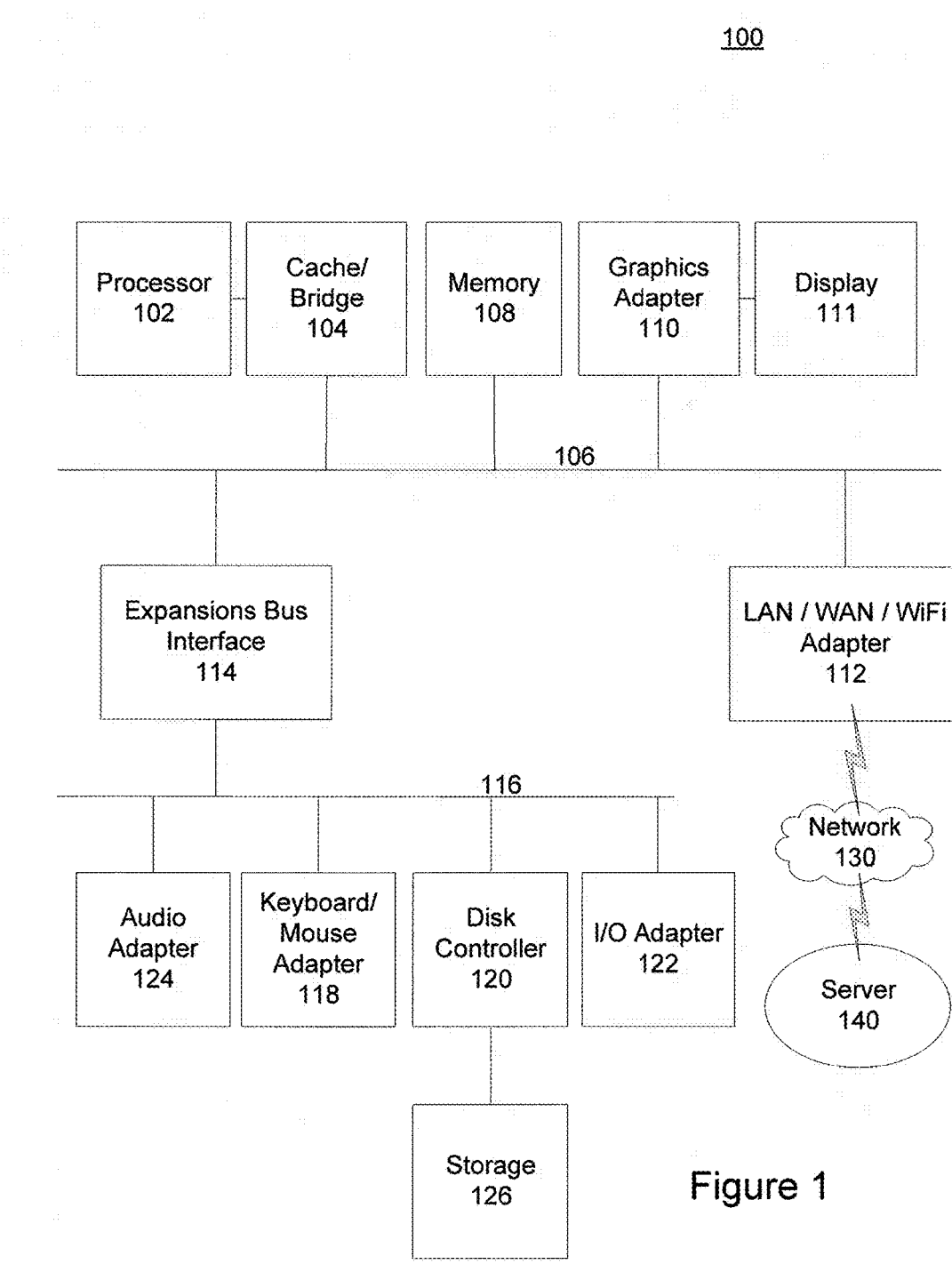
FIG. 1 depicts a block diagram of a data processing system in which an embodiment can be implemented.

FIG. 1 depicts a block diagram of a data processing system in which an embodiment can be implemented, for example as a particular machine or CAD system configured to perform the methods, processes, and functions described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Tools that enable a CAD system to efficiently search for existing parts are extremely valuable. Traditionally, such tools are text based and limits are quickly reached when working on complex parts or simply when working in a multi-lingual environment.

It is possible to search the geometry of parts itself, but this is a difficult problem that requires very technical solutions. One difficulty here is that the geometry of a part should be considered unchanged when that part is translated, rotated, or even sometimes scaled. Because there are an infinite number of such possible transformations, one cannot hope to design an efficient algorithm that compares two geometries by considering all their possible transformations under translation, rotation or scaling.

One solution to the above problem consists in extracting a descriptor from the geometries that is itself invariant under translation, rotation or scaling and to then use these descriptors to index the geometries. This solution is attractive since it efficiently divides the work in two phases, an off-line phase that includes the extraction of the descriptor from the geometry, and an on-line phase that includes the comparison of descriptors.

The off-line phase, extracting a descriptor from a 3D shape, is a rather slow operation. To be able to use a 3D geometry search engine such as the "Geolus Search" software component of UGS Siemens Product Lifecycle Management Software Inc., customers need to extract descriptors from every single part that they own. With databases that sometimes run into the hundreds of thousands of parts, or more, this can be a very slow process and every care should be taken to make the extraction of the descriptors as quick as possible. In particular, a process as disclosed herein, that replaces a computation time of O(N×T) by a linear O(N+T+K), where K is fixed and independent of N and T, is a very useful tool.

According to various disclosed embodiments:

Define space to be the vector space $R^3$.

Define dist to be the Euclidean distance.

Define norm to be the Euclidean norm.

Define $<,>$ to be the Euclidean scalar product.

Define $S^2$ to be the unit sphere in $R^3$.

Given a set $\sigma$, define #$\sigma$ to be its cardinal.

Define a partition $\Omega=\{\omega, \omega \in S^2\}$ of to be a set of mutually disjoint open subsets of $S^2$ with the property that the union of their closure is equal to $S^2$.

Given a point p in space, define its ray to be $$\rho(p)=\{\lambda p, \lambda > o\}$$

so that the ray through p is the half line going through p with end point the origin.

Assume a surface $\Delta$ in $R^3$ has been chosen. Let $f$ be a function on $R^3$. Define its associated radial function $\phi_f$ to be the function on $S^2$ that associates to every point p the sum of the values of $f$ at the intersection of the surface with the ray $\rho(p)$.

$$\varphi_f(p) = \sum_{q \in \Delta \cap \rho(p)} f(q)$$

Assume a surface $\Delta$ in $R^3$ has been chosen. Let $f$ be a function on $R^3$. Let the associated radial function be $\phi_f$. Define $\phi_f(\omega)$ to be the average value of $\phi_f$ on $\omega$, that is, $$\varphi_f(\omega) = \frac{\int_\omega dp\varphi_f(p)}{(\text{area of } \omega)} = \frac{\int_\omega dp\varphi_f(p)}{\alpha_\omega} \quad \text{(equation 1)}$$

where $\alpha_\omega$ is the area of $\omega$.

Assume a surface $\Delta$ in $R^3$ has been chosen. Let $f$ be a function on $R^3$. Define its associated radial distribution $\psi_f$ to be the function on $S^2$ that associates to every point p the average value of $f$ at the intersection of the surface with the ray $\rho(p)$.

$$\psi_f(p) = \frac{\sum_{q \in \Delta \cap \rho(p)} f(q)}{\#\{q \in \Delta \cap \rho(p)\}}$$

Assume a surface $\Delta$ in $R^3$ has been chosen. Let $f$ be a function on $R^3$. Let the associated radial function be $\psi_f$. Define $\psi_f(\omega)$ to be the average value of $\psi_f$ on $\omega$, that is.

$$\psi_f(\omega) = \frac{\int_\omega dp\psi_f(p)}{(\text{area of } \omega)}$$

Notice that for $\omega$ small enough $$\psi_f(\omega) \approx \frac{\varphi_f(\omega)}{\varphi_1(\omega)}$$

where 1 denotes the constant function equal to 1.

Given a surface $\Delta$ in $R^3$, a function $f$ on $R^3$ and a partition $\Omega$ of the sphere $S^2$, disclosed embodiments include a fast process to estimate the average value of the associated radial function and distribution on each element of $\Omega$. A direct approach to computing the radial function $\phi_f$ and radial distribution $\psi_f$ involves finding the sets $$\{q \in \Delta \cap \rho(p)\}$$

for various points p on the sphere. This is slow since if there are N points and the surface $\Delta$ is given by T triangles, then O(N×T) operations will be necessary.

Given a ray, finding the intersection of that ray with a surface is a costly operation. However, given a point on a surface, finding the ray through this point is a trivial operation. Disclosed embodiments use this fact to compute an associated radial function/distribution quickly.

Figure 2:
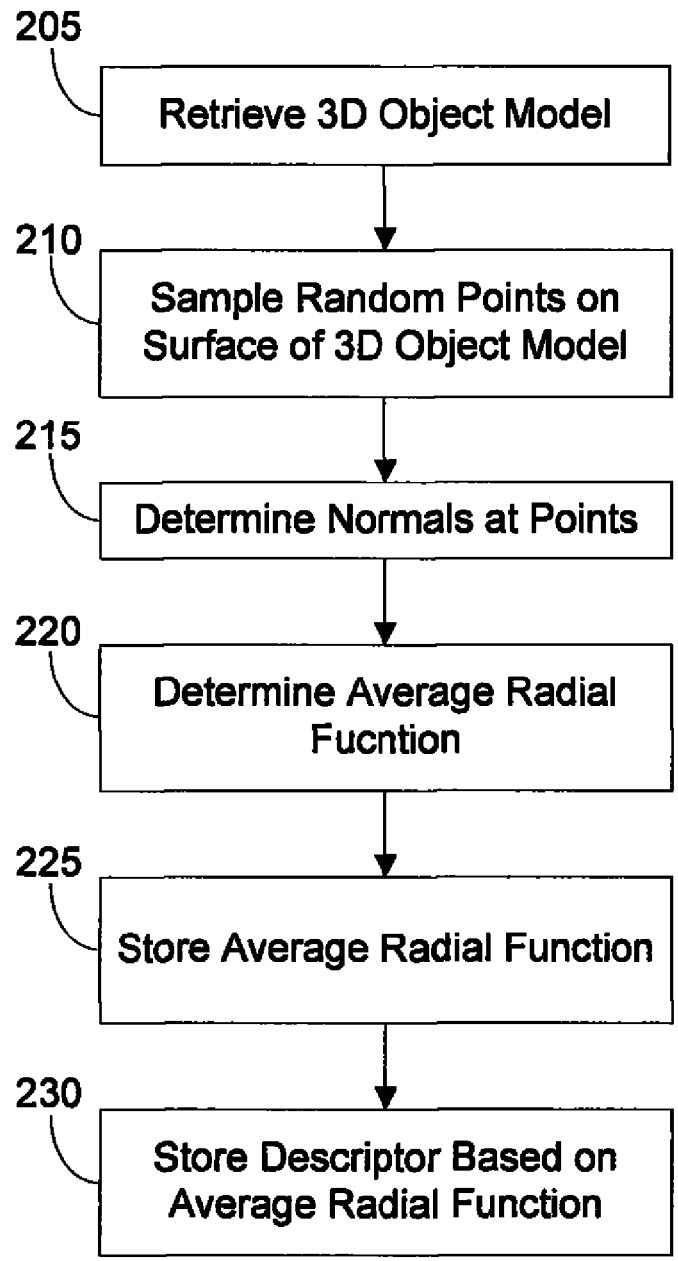
FIGS. 2 and 3 depict flowcharts of processes in accordance with disclosed embodiments.

FIG. 2 depicts a flowchart of a process in accordance with a disclosed embodiment.

First, a CAD system retrieves a 3D object model from a database (step 205).

Next, the CAD system samples K points $\{p_k, k=1, \ldots, K\}$ randomly (preferably using a uniform distribution) on the surface $\Delta$ of the 3D object model (step 210).

Next, the CAD system determines the normal vectors $\{v_k, k=1, \ldots, K\}$ to $\Delta$ at these points (step 215).

Next the CAD system determines the average of a radial function $\phi_f$ on each projected arc $\omega$ in $\Omega$ using the sampled points and normal vectors (step 220). In some embodiments, the radial function is determined according to a projection of the random point on a sphere, and includes using a correcting term to adjust for non-uniform distribution of the sampled points as projected on a sphere.

The CAD system stores the average of $\phi_f$ on each $\omega$ in $\Omega$ in a database as a radial distribution $\psi$ associated with the 3D object model (step 225). The radial function and distribution can be stored and used as an object descriptor to identify the 3D object model in the database (step 230). The radial distribution corresponds to at least two of the radial functions $\phi_f$. The radial distribution and average values of the radial functions can be stored in the CAD system corresponding to the object model.

In some embodiments, the radial function can also be used to compute a rotation-invariant descriptor for the 3D object model, based on the value of the radial function or distribution at a set of points on the sphere as determined above.

Various steps are described in more detail below.

Sampling points on the surface: Finding K random points on a surface is a well known problem with well known solutions to those of skill in the art. If the surface is represented by T triangles, the sampling can be done in O(T+K) operations.

Computing $\phi_f$: Let N be the cardinal of $\Omega$. Recall that if $p_k$ is a point on the surface $\Delta$, then the normal to this surface at $p_k$ is denoted $v_k$.

Figure 3:
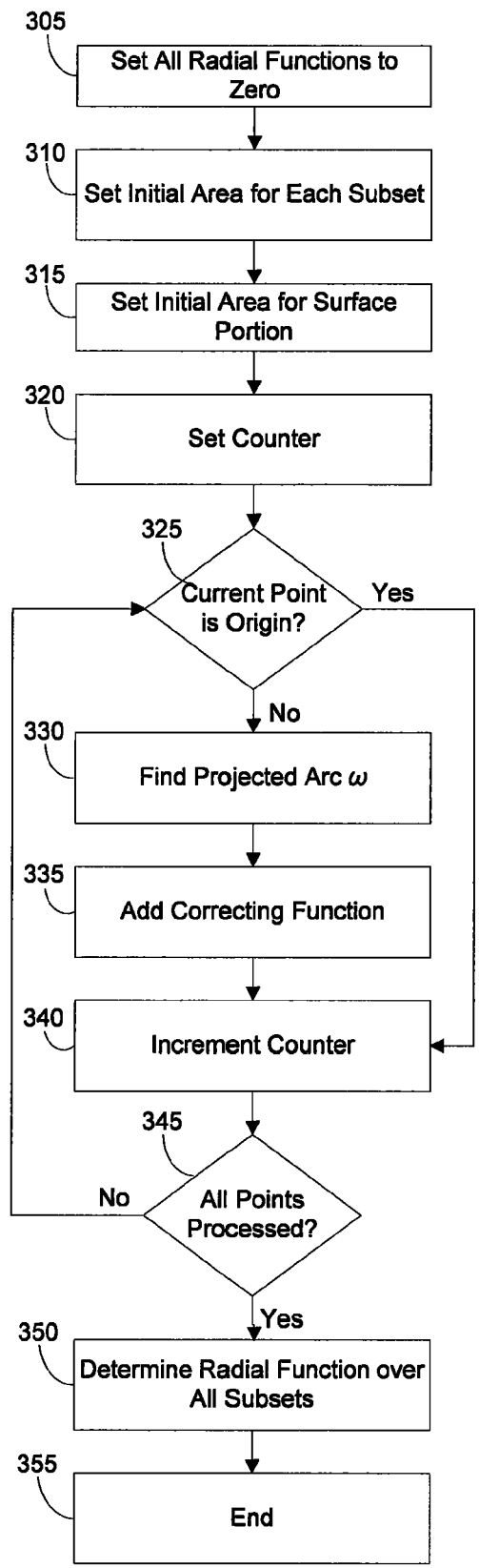

FIG. 3 depicts a flowchart of a process performed by the CAD system to determine all $\phi_f(\omega)$.

The CAD system first initializes all radial functions $\phi_f(\omega)$ to zero (step 305).

Next, for each subset $\omega$ of the object model, the CAD system sets $\alpha_\omega$ to equal area of $\omega$ (step 310).

Next, the CAD system sets ad to equal the area of a selected surface portion $\Delta$ (step 315).

Next, the CAD system sets counter k=1 (step 320).

Next, if $p_k$ is the origin (step 325), the CAD system skips to step 340, below. If $p_k$ is not the origin (at step 325), then the CAD system finds a projected arc $\omega$ such that $p(p_k)$ intersects $\omega$ (step 330).

Next, the CAD system adds a correcting function $$f(p_k) \cdot \frac{|\langle v_k, p_k \rangle|}{norm(p_k)^3}$$

to $\phi_f(\omega)$ (step 335).

The CAD system sets k=k+1 (step 340).

The system determines if all points have been processed, by testing whether k<K (step 345). If not (k<K is true), the system returns to step 325. If k≥K, then for each $\omega$, the system applies a normalizing term by setting $$\varphi_f(\omega) = \varphi_f(\omega) \cdot \frac{\alpha_\Delta}{K \cdot \alpha_\omega}$$

to determine the radial function for all subsets $\omega$ (step 350), and the process ends (step 355).
to determine the radial function for all subsets $\omega$ (step 350), and the process ends (step 355).

Note that step 335 above can generally be achieved in constant time, particularly in the case where, for example, $\Omega$ is a simple voxelisation of the sphere. When step 335 can be performed in constant time, the process described above requires only O(N+K) operations.

To compute radial distribution $\psi_f$, simply note that if $\omega$ is small enough $$\psi_f(\omega) \approx \frac{\varphi_f(\omega)}{\varphi_1(\omega)}.$$

Those of skill in the art will appreciate the analytical basis for the processes disclosed herein. The exact value of $\phi_f(\omega)$ is defined above in equation 1. In some embodiments, the radial distribution is associated with a function on three-dimensional space and the three-dimensional object model as the quotient of a first radial function and a second radial function, where the second radial function is associated with a function on three-dimensional space that is constant and equal to 1. This integral can be approximated by choosing M randomly generated points q1, . . . , $q_M$ on $\omega$ and taking the value $$\varphi_f(\omega) \approx \frac{1}{M} \cdot \sum_{m=1}^{M} \varphi_f(q_m)$$

An underlying approach of the disclosed process is to replace the integral of equation 1 over $\omega$ by an integral over the portion of $\Delta$ that sits under $\omega$; i.e., the intersection of $\Delta$ with the cone which has the origin for apex and $\omega$ for its base.

In technical terms, this is a pull-back from an integral on the sphere to an integral on the surface $\Delta$. To achieve this, instead of choosing points randomly in $\omega$ for each $\omega$, the process chooses random points $p_1, \ldots, p_K$ on the surface $\Delta$ and uses their projections onto the sphere $S_2$. This set of projected points is not randomly distributed over the sphere.

In some embodiments, the radial functions and the radial distribution corresponding to the object model are stored in the CAD system as average values on element of a partition of a sphere.

Figure 4A:
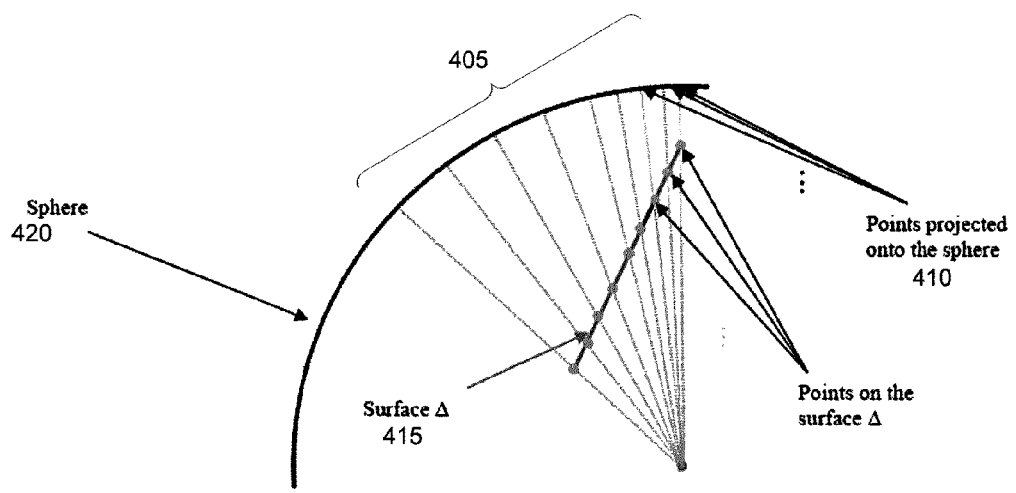
FIGS. 4a and 4b illustrate non-uniform distributions of projected points.
Figure 4B:
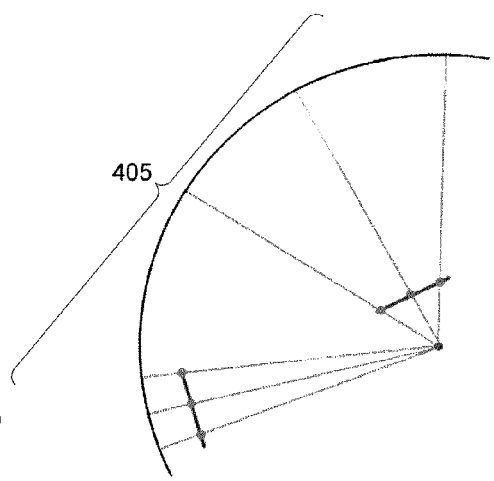

FIGS. 4a and 4b illustrate the non-random distribution 405 of points 410 of the surface $\Delta$ 415 projected onto sphere 420. Points p that are in areas of $\Delta$ where the normal to $\Delta$ is parallel with the line formed by the origin and points p are projected onto less densely distributed areas than other points, as illustrated in FIG. 4a. Points that are close to the origin are projected onto less densely distributed areas than other points, as shown in FIG. 4b.

It is these two effects that are the cause of the correcting term $$\frac{|\langle v_k, p_k \rangle|}{norm(p_k)^3}$$

in step 335 and of the normalizing term $$\frac{\alpha_\Delta}{K \cdot \alpha_\omega}$$

in step 350.

Of course, those of skill in the art will appreciate that various modifications and variations of the process above may be considered, and are intended to fall within the scope of the disclosed embodiments. For example, if $p_k$ is close to the origin, step 335 in the process above can lead to numerical instability.

To correct this, one can add a 'black box' effect near the origin. More precisely, define $\epsilon$ to be the value under which a norm($p_k$) would cause a problem. Then, before step 305, the CAD system would set L=K (step 302, not illustrated). Step 325 would be modified so that if $p_k$ is the origin, then if norm($p_k$)<$\epsilon$, then set L=L−1 before skipping to step 340. Step 350 would then be modified so that for each $\omega$, the CAD system sets $$\varphi_f(\omega) = \frac{\varphi_f(\omega) \cdot \alpha_\Delta}{L \cdot \alpha_\omega}.$$

This has the effect of ignoring all points with a norm smaller than $\epsilon$.

Various embodiments include a system, method, and computer program product for determining a radial function and distribution of a three-dimensional object model. One method includes retrieving a three-dimensional object model in a CAD system, and sampling random points on the surface of the object model. The method also includes determining a normal vector corresponding to each of the random points and determining a radial function corresponding to each normal vector and respective random point. The method also includes storing an average of the radial functions in the CAD system as a normal distribution corresponding to the object model.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for determining a radial function and distribution of a three-dimensional object model, comprising:
   retrieving a three-dimensional object model in a CAD system;
   sampling, by the CAD system, random points on the surface of the object model;
   determining, by the CAD system, a normal vector corresponding to each of the random points;
   determining, by the CAD system, a radial function corresponding to each normal vector and respective random point;
   determining, by the CAD system, a radial distribution corresponding to at least two of the radial functions; and
   storing the radial distribution and average values of the radial functions in the CAD system.

2. The method of claim 1, further comprising associating the radial distribution with the object model as a CAD object descriptor.

3. The method of claim 1, wherein the random points are sampled using a uniform distribution.

4. The method of claim 1, wherein the radial function is determined according to a projection of the random point on a sphere.

5. The method of claim 1, wherein determining the radial function includes using a correcting term to adjust for non-uniform distribution of the sampled points as projected on a sphere.

6. The method of claim 1, wherein the radial function is associated with a function on three-dimensional space and the three-dimensional object model.

7. The method of claim 1, wherein sample points within a preselected normal distance from the origin are ignored.

8. The method of claim 1, wherein the radial distribution is associated with a function on three-dimensional space and the three-dimensional object model as the quotient of a first radial function and a second radial function, wherein the second radial function is associated with a function on three-dimensional space that is constant and equal to 1.

9. The method of claim 1, wherein the radial functions and the radial distribution corresponding to the object model are stored in the CAD system as average values on elements of a partition of a sphere.

10. A data processing system comprising a processor and accessible memory, the data processing system implementing a CAD system and configured to perform the steps of:
    retrieving a three-dimensional object model;
    sampling random points on the surface of the object model;
    determining a normal vector corresponding to each of the random points;
    determining a radial function corresponding to each normal vector and respective random point;
    determining a radial distribution corresponding to at least two of the radial functions; and storing the radial distribution and average values of the radial functions.

11. The data processing system of claim 10, further configured to perform the step of associating the radial distribution with the object model as a CAD object descriptor.

12. The data processing system of claim 10, wherein the random points are sampled using a uniform distribution.

13. The data processing system of claim 10, wherein the radial function is determined according to a projection of the random point on a sphere.

14. The data processing system of claim 10, wherein determining the radial function includes using a correcting term to adjust for non-uniform distribution of the sampled points as projected on a sphere.

15. The data processing system of claim 10, wherein the radial function is associated with a function on three-dimensional space and the three-dimensional object model.

16. The method of claim 10, wherein sample points within a preselected normal distance from the origin are ignored.

17. The data processing system of claim 10, wherein the radial distribution is associated with a function on three-dimensional space and the three-dimensional object model as the quotient of a first radial function and a second radial function, wherein the second radial function is associated with a function on three-dimensional space that is constant and equal to 1.

18. The data processing system of claim 10, wherein the radial functions and the radial distribution corresponding to the object model are stored in the CAD system as average values on elements of a partition of a sphere.

19. A non-transitory computer-readable medium encoded with computer-executable instructions that, when executed, cause a data processing system to perform the steps of:
    retrieving a three-dimensional object model;
    sampling random points on the surface of the object model;
    determining a normal vector corresponding to each of the random points;
    determining a radial function corresponding to each normal vector and respective random point;
    determining a radial distribution corresponding to at least two of the radial functions; and
    storing the radial distribution and average values of the radial functions.

20. The computer-readable medium of claim 19, further encoded with computer-executable instructions that, when executed, cause the data processing system to perform the step of associating the radial distribution with the object model as a CAD object descriptor.

* * * * *